Feb. 15, 1966  C. B. TINSLEY ET AL  3,234,964
MANIFOLD
Filed Sept. 23, 1963
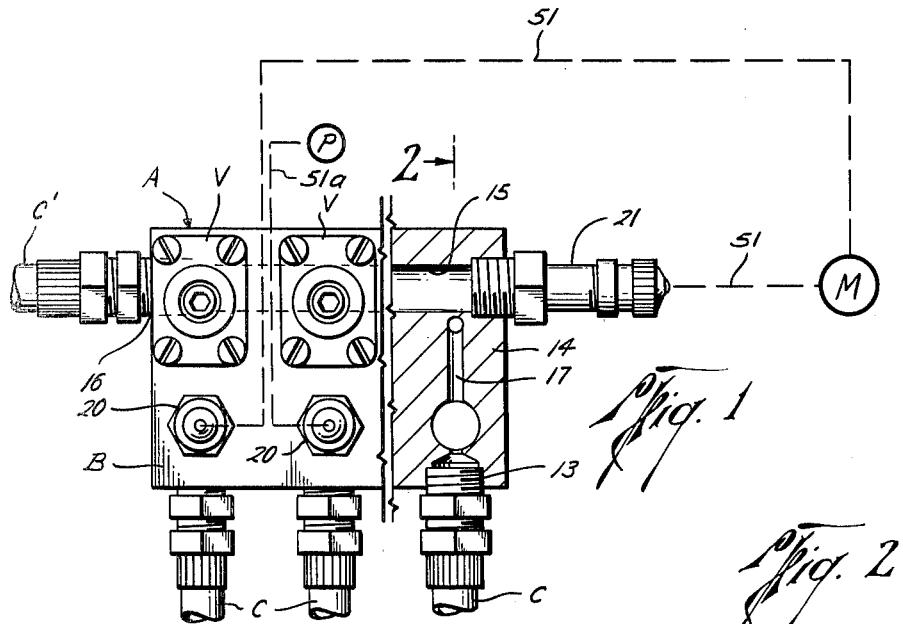
Fig. 1
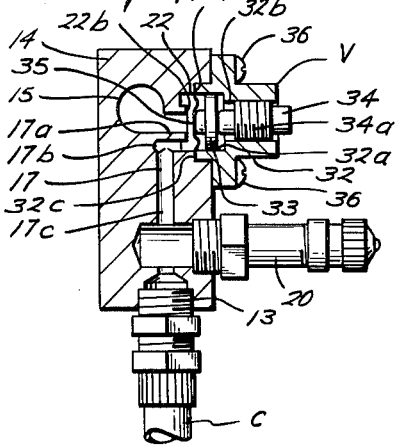
Fig. 2
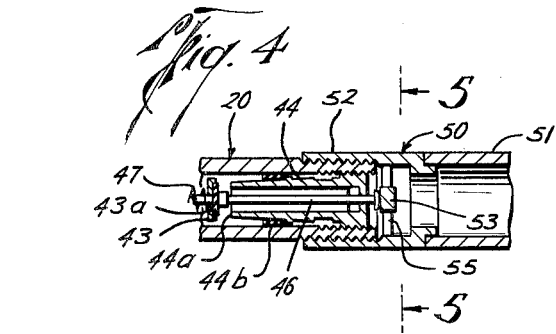
Fig. 4
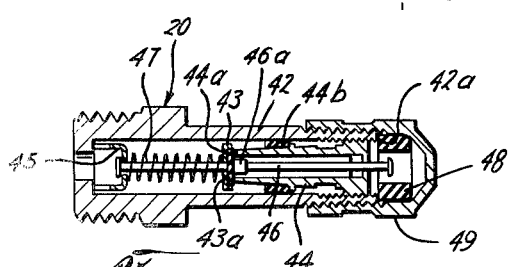
Fig. 3
Fig. 5
Cleere B. Tinsley
Edward K. Graham, Jr.
INVENTORS
BY Hayden + Pravel
ATTORNEYS United States Patent Office 3,234,964
Patented Feb. 15, 1966

3,234,964
MANIFOLD
Cleere B. Tinsley and Edward K. Graham, Jr., both of 6414 Brompton Road, Houston 5, Tex.
Filed Sept. 23, 1963, Ser. No. 310,569
3 Claims. (Cl. 137—608)

The present invention relates to a manifold for distributing gas under pressure to a plurality of pressurized cables, and more particularly to a gas-distribution manifold for a plurality of pressurized cables which is adaptable for testing the rate of gas flow and pressure in any one of such cables.

It is old in the art to introduce dry air or gas under pressure into a sealed cable containing electric wires or the like to prevent an accumulation of moisture in the cables that will cause a short circuit in such electrical wires and to provide a pressure in the cables greater than atmospheric pressure. Such pressurized gas or dry air serves not only as an aid to detect and locate leaks in the cable but, in the event of a break or a leak, such gas is expelled thereby inhibiting the intrusion of foreign matter or substances into the cable. As the cables presently used are not absolutely "air-tight," it is therefore common for such pressurized cables to lose a certain amount of air or other pressurizing substance through the small leaks that occur in the cable. The number of leaks depends in part on the size, length and location of the particular cable and other factors relating to its use. A portion of the air or gas escapes from the cable allowing additional gas or air to flow into the cable. By periodically testing the pressure and by checking the flow of air into a cable, its condition and effectiveness can be determined.

An object of the present invention is to provide a new and improved manifold for distributing gas or air under pressure to a plurality of cables in which the gas supply to one or more of such cables may be selectively shut off without disturbing the supply of gas to other cables.

Another object of the present invention is to provide a new and improved manifold device distributing air or gas under pressure to a plurality of sealed cables, with means for measuring the gas flowing from the manifold to a particular cable without interrupting the flow of gas to the other cables connected to the manifold device.

And yet another object of the present invention is to provide a new and improved manifold apparatus for distributing gas under pressure to a plurality of cables with means for testing the pressure in any cable without interfering with the supply of gas to the other cables.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevational view, partly schematic and partly in section, illustrating the device of the present invention, FIG. 2 is a sectional view taken on line 2—2 of FIG. 1 of the drawings illustrating details of construction of the present invention, FIG. 3 is a sectional view of the check valve of the present invention illustrating the valve in the closed position, FIG. 4 is a sectional view illustrating the actuating connector of the present invention for opening the check valve, and FIG. 5 is a sectional view taken on line 5—5 of FIG. 4 and showing additional details of construction of the actuating connector.

In FIG. 1 of the drawings, the letter A designates generally the manifold apparatus or device of the present invention which includes a manifold block assembly B for distributing air or other gas under pressure to one or more cables C connected thereto. As will be explained hereinafter, with the present invention, the rate of gas flow and pressure in each cable C may be determined without interfering with the pressure or gas flow to the other cables C connected to the manifold block assembly B.

Considering now the invention in more detail, in its preferred form as illustrated in FIG. 1 of the drawings, the manifold block assembly B is cast or otherwise formed from non-corrosive material, and includes a manifold block or housing 14 having a longitudinal substantially cylindrical bore or chamber 15 therein for receiving pressurized air or gas through a manifold inlet 16 which has a suitable hose or cable C' connected therewith and to a source of gas pressure (not shown). The block 14 also includes a plurality of passages 17 for distributing the air or gas to the cables C connected thereto, as will be described more fully herein.

A by-pass valve V is provided adjacent each passage 17 for controlling the flow of the gas from the chamber or tube 15 to each of such passages 17. Each valve V works in a chamber or cylinder 22 of the block 14 which establishes communication from the chamber 15 to a particular passage 17 when its valve V is opened. Each of the passages 17 formed in the manifold block 14 in communication with the chamber 15, includes a channel 17a, a duct 17b and a canal 17c. The channel 17a extends from the chamber 15 to the by-pass valve cylinder 22, and the duct 17b leads from the valve cylinder 22 to the canal 17c to which the cable C is connected by a threaded coupling 13.

Each by-pass valve V includes a valve body 32, having a cylindrical bore or chamber 32a formed therein for receiving a piston or closure member 33, which is moved longitudinally of the chamber 32a on a threaded shaft or rod 34. Preferably, the valve body 32 also has a threaded bore 32b formed therein coaxially of the chamber 32a, for receiving threads 34a on the rod or shaft 34.

The valve body 32 is secured by screws 36, or other suitable means, to the manifold block 14 with a flexible diaphragm 35 of metal such as stainless steel or the like clamped between an annular end 32c and an annular shoulder 14a. The piston or plug 33 moves the diaphragm to the left (as viewed in FIG. 2) into sealing contact with an annular lip 22b to close or prevent fluid flow from the bore 15 to the passage 17, by rotation of the threaded shaft 34. To open the valve V, the shaft 34 is rotated so as to move the piston 33 to the right so as to release the engagement with the annular surface 22b. When the diaphragm 35 thus is disengaged from the surface 22b, communication from the chamber 15 to the cables C is established.

The valve-connector 20, specifically illustrated in FIG. 3 of the drawings, includes a tubular body 42 adapted to receive a valve member or disk 43. The valve member 43 is carried on a longitudinally slidable pin or shaft 46 which is mounted substantially axially of a sleeve 44 and a support 45. The disk 43 has a rubber insert or washer 43a which is held in place by a coupling 46a so that such washer 43a engages and disengages an annular valve seat 44a of the sleeve 44 to control communication of air or gas through the valve-connector 20. A spring 47 is provided on the pin 46 to urge the disk 43 into engagement with the seat 44a to seal the valve-connector 20 closed. A seal ring 44b of rubber or the like seals the annular area between the sleeve 44 and the body 42.

A threaded cap member 49, having a gasket or sealing member 48 therein, for engaging the annular shoulder 42a of the tubular member 42, provides an additional means for sealing the valve-connector 20 closed.

A valve actuator-connector 50, illustrated in FIGS. 4 and 5 of the drawings, is provided for connecting a meter hose or conduit 51 to the valve-connector 20 and for actuating the valve rod 46 therein. The actuator-connector 50 comprises a cylindrical sleeve 52 having a contact head 53 supported axially therein by radially extending support members 55 for engaging the pin 46 to hold open the valve member 43 while the actuator-connector 50 is attached to the valve-connector 20. The outlet connector 21, provided at the end of the chamber 15 for discharging air or gas therefrom, is identical to the valve-connectors 20.

In operation, a supply of pressurized gas or air is introduced through the intake port 16 into the chamber 15 of the manifold block 14, and then distributed through the by-pass valves V which are open to the passages 17 and the various cables C connected thereto to pressurize the cables C and to indicate leaks or breaks therein.

To test the pressure in a particular cable, the by-pass valve V in the line 17 leading thereto is closed, thus closing off communication of pressurized gas or air from the chamber 15 to the cable C being tested. The cap 47 is removed from the valve-connector 20 of the cable being tested and, as illustrated schematically in FIG. 1 of the drawings, a pressure gauge P is attached thereto by means of a hose 51a having a connector 50 (FIG. 4) therewith. When the valve actuator-connector 50 is attached to the valve-connector body 42, the contact head 53 depresses the pin or plunger 46 and thus opens the valve disk 43. With the pressure gauge P thus connected, a pressure reading is then taken to determine the pressure in the particular cable C being tested. After the test has been completed, the valve actuator-connector 50 is disconnected from the valve-connector 20 and the spring 47 urges the valve disk 43 back into engagement with the annular seal 44a, thus closing the valve-connector 20.

To test the rate of flow of air or gas into a particular cable C, the by-pass valve V connecting with such cable C is closed and, as illustrated schematically in FIG. 1 of the drawings, one side of a flow meter M is connected by a connector 50 on the meter hose 51 to the outlet connector 21 and the other side of the flow meter M is connected in a like manner to the valve-connector 20 in communication with the cable C being tested. Thus, pressurized air from the chamber 15 is allowed to flow directly through the flow meter M and then to the cable C being tested which will indicate the rate of gas flow in the particular cable being tested without disturbing the normal flow of the gas through the other cables C.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. A gas distribution manifold for distributing gas under pressure to a plurality of pressurized cables connected thereto, including:
 (a) a manifold block,
 (b) a chamber in said block for receiving a supply of gas under pressure,
 (c) passage means in said block communicating said chamber and the pressurized cables connected to said passage means,
 (d) valve means adjacent each of said passage means for selectively opening and closing communication of pressurized gas through each of said passage means independently of the other of said passage means,
 (e) outlet means for said chamber,
 (f) gas conduit for connection to said outlet means for flowing gas therefrom,
 (g) connector means with each of said passages for receiving gas flowing under pressure from said outlet means to pressurize the cable connected thereto, and
 (h) meter means intermediate said outlet means and said connector for flowing the pressurized gas therethrough to measure the quantity of such gas flow.

2. A gas distribution manifold for distributing gas under pressure to a plurality of pressurized cables connected thereto, including:
 (a) a manifold block,
 (b) a chamber in said block for receiving a supply of gas under pressure,
 (c) a valved outlet unit mounted on said manifold block and communicating with said chamber for controlling the flow of fluid from said chamber,
 (d) passage means in said block communicating said chamber and the pressurized cables connected to said passage means,
 (e) valve means adjacent each of said passage means for selectively opening and closing communication of pressurized gas through each of said passage means independently of the other of said passage means, and
 (f) connector means for each of said passage means downstream of said valve means for establishing communication between said valved outlet and said passage means.

3. The invention of claim 2 including a hose extending from the valved outlet unit to the connector means and valve means with the connector means for normally holding pressure in the passage means until open and adapted to be opened when said hose is connected to the connector means.

References Cited by the Examiner
UNITED STATES PATENTS

| 456,546 | 7/1891 | Blankerts | 137—608 |
| 2,325,685 | 8/1943 | Keefe | 137—223 |
| 2,439,723 | 1/1946 | Engdahl | 73—211 |
| 2,931,387 | 4/1960 | Fleming | 137—608 |

M. CARY NELSON, *Primary Examiner,*

LAVERNE D. GEIGER, *Examiner,*